(12) United States Patent
Noborio (10) Patent No.: US 6,683,664 B2
(45) Date of Patent: Jan. 27, 2004

(54) LEAKAGE ELECTRIC FIELD PREVENTING SHEET, LIQUID CRYSTAL DISPLAY UNIT AND LIQUID CRYSTAL DISPLAY DEVICE

(75) Inventor: Masaki Noborio, Kato (JP)

(73) Assignee: Fujitsu Limited, Kawasaki (JP)

( * ) Notice: Subject to any disclaimer, the term of this patent is extended or adjusted under 35 U.S.C. 154(b) by 7 days.

(21) Appl. No.: 10/125,745

(22) Filed: Apr. 17, 2002

(65) Prior Publication Data

US 2003/0137616 A1 Jul. 24, 2003

(30) Foreign Application Priority Data

Jan. 18, 2002 (JP) ........................................ 2002-010869

(51) Int. Cl.[7] .............................................. G02F 1/1333
(52) U.S. Cl. ............................................................ 349/58
(58) Field of Search .............................. 349/58, 59, 62, 349/70; 362/221, 222, 31, 561

(56) References Cited

FOREIGN PATENT DOCUMENTS

| JP | 5-303341 | 11/1993 |
|----|----------|---------|
| JP | 2000-236173 | 8/2000 |
| JP | 2000-244174 | 9/2000 |
| JP | 2001-042311 | 2/2001 |

*Primary Examiner*—James Dudek
*Assistant Examiner*—Richard Kim
(74) *Attorney, Agent, or Firm*—Greer, Burns & Crain, Ltd.

(57) ABSTRACT

A fluorescent tube cable for supplying a high voltage to a fluorescent tube inside a liquid crystal display panel is extended from a side face of the liquid crystal display panel to the conductive non-display surface side (conductive plate side), and an intermediate portion of the fluorescent tube cable is held with a notch portion of a leakage electric field preventing sheet so as to bring the fluorescent tube cable into contact with the conductive non-display surface side (the conductive plate) of the liquid crystal display panel. The fluorescent tube cable is grounded at this contact, and a leakage electric field of low frequency which is produced from the fluorescent tube cable is prevented.

11 Claims, 5 Drawing Sheets

LEAKAGE ELECTRIC FIELD PREVENTING SHEET, LIQUID CRYSTAL DISPLAY UNIT AND LIQUID CRYSTAL DISPLAY DEVICE

BACKGROUND OF THE INVENTION

The present invention relates to a sheet for preventing a leakage electric field of low frequency which is produced from a fluorescent tube cable of a liquid crystal display device, and also relates to a liquid crystal display unit and a liquid crystal display device, including the sheet.

In a liquid crystal display device which displays an image by controlling the driving of liquid crystal and the emission of light from a fluorescent tube, based on image data, in order to apply a high voltage to the fluorescent tube, an inputted low voltage is converted into a high voltage by an inverter and the resulting high voltage is supplied to the fluorescent tube through a fluorescent tube cable. In such a liquid crystal display device, a leakage electric field of low frequency is produced from the fluorescent tube cable which serves as a path of the high voltage. This leakage electric field is a noise component, and may disturb the realization of a stable display condition. It is therefore necessary to take some measures to prevent such a leakage electric field.

Figure 1:
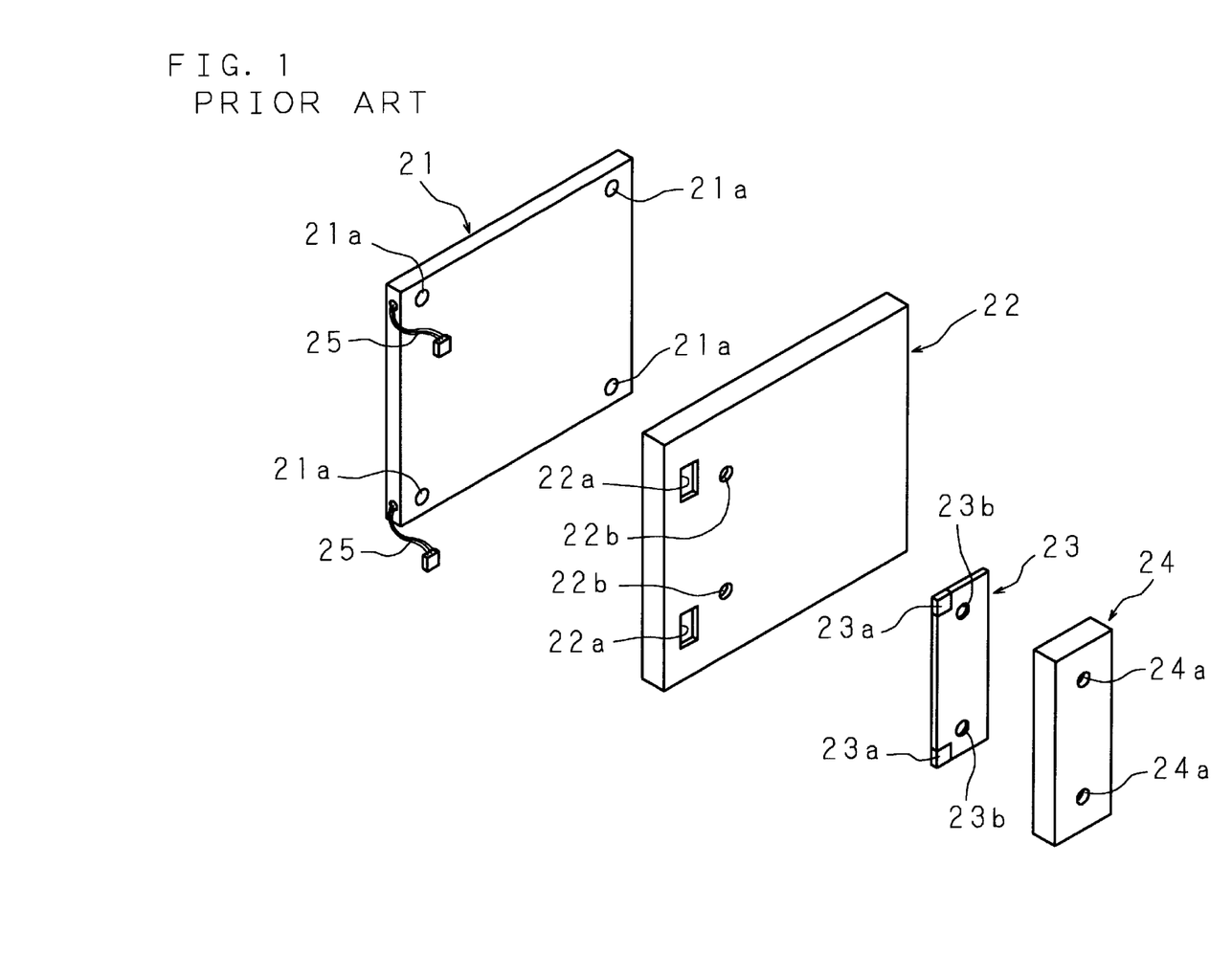
FIG. 1 is an exploded perspective view of a conventional liquid crystal display unit.
Figure 2:
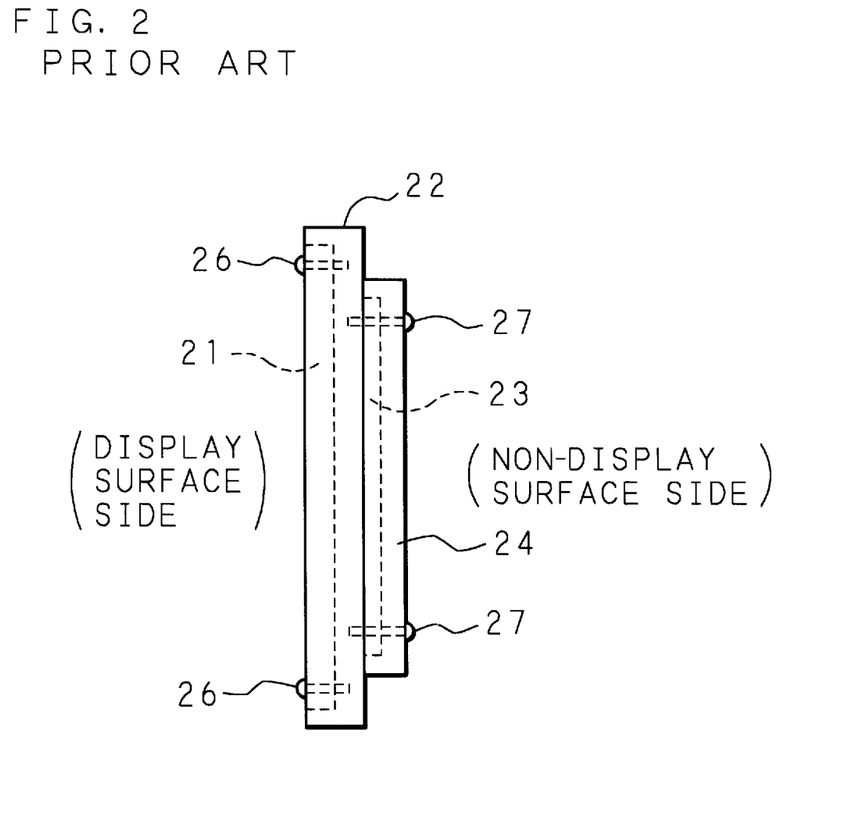
FIG. 2 is a side view of the conventional liquid crystal display unit.

FIG. 1 and FIG. 2 are the exploded perspective view and side view of a conventional liquid crystal display unit adopting measures to prevent a leakage electric field. This liquid crystal display unit is configured by superimposing a liquid crystal display panel 21, a sheet metal shield member 22, an inverter printed board 23, and a covering shield member 24 in this order.

The liquid crystal display panel 21 has a flat body including a glass plate on its display surface side (front-face side) and a plastic plate on both of the non-display surface side (rear-face side) and the side-face side. Fluorescent tubes are attached to the upper and lower edges inside the liquid crystal display panel 21, respectively. Two bundles of fluorescent tube cables 25 composed of a plurality of thin wires for supplying a high voltage to the respective fluorescent tubes are connected to the fluorescent tubes, and each fluorescent tube cable 25 is extended to the non-display surface side (rear-face side) of the liquid crystal display panel 21. Moreover, screw holes 21a for attachment are formed in the four corners of the liquid crystal display panel 21.

The sheet metal shield member 22 has a flat body made of metal without a lid, and is placed to cover the non-display surface (rear face) of the liquid crystal display panel 21. The sheet metal shield member 22 has two cut holes 22a for pulling out the respective fluorescent tube cables 25 to the inverter printed board 23 side, and screw holes 22b in two positions. On the inverter printed board 23, an inverter circuit for converting an inputted DC voltage into an AC voltage is printed. The inverter printed board 23 has two connecting parts 23a serving as high voltage outputting parts to which the fluorescent tube cables 25 are connected respectively. Furthermore, the inverter printed board 23 has screw holes 23b which are formed in two positions corresponding to the screw holes 22b. The covering shield member 24 has a flat body made of metal without a lid, and is placed to cover the rear face of the sheet metal shield member 22. The covering shield member 24 has screw holes 24a in two positions corresponding to the screw holes 22b and the screw holes 23b.

A conventional liquid crystal display unit is assembled as follows. In a state where the fluorescent tube cables 25 are pulled out from the cut holes 22a of the sheet metal shield member 22 to the inverter printed board 23 side, the non-display surface (rear face) of the liquid crystal display panel 21 is covered with the sheet metal shield member 22, and screws 26 are inserted into the screw holes 21a and screwed into the sheet metal shield member 22 so as to attach and secure the sheet metal shield member 22 to the liquid crystal display panel 21. The tips (connectors) of the fluorescent tube cables 25 pulled out from the cut holes 22a are connected to the connecting parts 23a of the inverter printed board 23. Then, the sheet metal shield member 22 is covered with the covering shield member 24 with the inverter printed board 23 between them, and screws 27 are inserted into the screw holes 24a, the screw holes 23b and the screw holes 22b so as to attach and secure the inverter printed board 23 and the covering shield member 24 to the sheet metal shield member 22 with the screws 27. Note that a protective insulating sheet may also be placed between the sheet metal shield member 22 and the inverter printed board 23.

In such a conventional liquid crystal display unit, the fluorescent tube cables 25 extended to the non-display surface side (rear-face side) of the liquid crystal display panel 21 are covered with the sheet metal shield member 22, and the fluorescent tube cables 25 pulled out from the cut holes 22a are covered with the covering shield member 24, so that leakage electric fields of low frequency which are produced from the fluorescent tube cables 25 are prevented by the presence of the sheet metal shield member 22 and covering shield member 24.

In the conventional liquid crystal display unit, since a sheet metal shield member, a covering shield member etc. are included so as to prevent a leakage electric field from a fluorescent tube cable, there is a problem that the overall thickness of the liquid crystal display unit becomes thicker. Moreover, since such shield members are essential, there is also a problem of high cost.

BRIEF SUMMARY OF THE INVENTION

The present invention has been made with the aim of solving the above problems, and it is an object thereof to provide a leakage electric field preventing sheet capable of preventing a leakage electric field from a fluorescent tube cable without including a shield member like those used conventionally and of significantly reducing the thickness of a liquid crystal display unit and a liquid crystal display device, and to provide a liquid crystal display unit and a liquid crystal display device, including the sheet.

Another object of the present invention is to provide a leakage electric field preventing sheet capable of reducing the costs of a liquid crystal display unit and a liquid crystal display device because it does not require a shield member like those used conventionally, and to provide a liquid crystal display unit and a liquid crystal display device, including the sheet.

A leakage electric field preventing sheet according to the first aspect of the present invention is a non-conductive sheet for preventing a leakage electric field which is produced from a fluorescent tube cable for supplying electric power to one or a plurality of fluorescent tubes attached to a liquid crystal display panel having a conductive non-display surface at the opposite side of a display surface, and is configured so as to bring the fluorescent tube cable into contact with the non-display surface of the liquid crystal display panel. The leakage electric field preventing sheet of the first aspect is a non-conductive sheet, and brings the fluorescent tube cable extended from the conductive non-display surface side (rear-face side) of the liquid crystal display panel into contact with the conductive non-display surface of the liquid crystal display panel. Accordingly, the fluorescent tube cable can be grounded on the conductive non-display surface of the liquid crystal display panel. It is therefore possible to efficiently prevent a leakage electric field from the fluorescent tube cable in a simple manner without using shield members as in the conventional example.

A leakage electric field preventing sheet according to the second aspect of the present invention is based on the first aspect, and comprises a notch portion for holding the fluorescent tube cable. The leakage electric field preventing sheet of the second aspect holds the fluorescent tube cable extended from the conductive non-display surface side (rear-face side) of the liquid crystal display panel with the notch portion. Thus, the leakage electric field preventing sheet certainly brings the fluorescent tube cable into contact with the conductive non-display surface of the liquid crystal display panel.

A liquid crystal display unit according to the third aspect of the present invention comprises: a liquid crystal display panel including one or a plurality of fluorescent tubes; a fluorescent tube cable for supplying electric power to the fluorescent tube; a leakage electric field preventing sheet of the first or second aspect; and an inverter printed board connected to the fluorescent tube cable. The liquid crystal display unit of the third aspect prevents a leakage electric field from the fluorescent tube cable by using the above-mentioned leakage electric field preventing sheet of the first or second aspect, and therefore shield members which are used in the conventional example are unnecessary, and both the thickness and the cost of the liquid crystal display unit are reduced.

A liquid crystal display device according to the fourth aspect of the present invention is a liquid crystal display device for displaying an image by driving a liquid crystal, and comprises a liquid crystal display unit of the third aspect. The liquid crystal display device of the fourth aspect comprises the above-mentioned liquid crystal display unit of the third aspect which prevents a leakage electric field from the fluorescent tube cable in a simple manner, and therefore shield members which are used in the conventional example are unnecessary, and both the thickness and the cost of the liquid crystal display device are reduced.

The above and further objects and features of the invention will more fully be apparent from the following detailed description with accompanying drawings.

DETAILED DESCRIPTION OF THE INVENTION

The following description will explain the present invention in detail with reference to the drawings illustrating an embodiment thereof.

Figure 3:
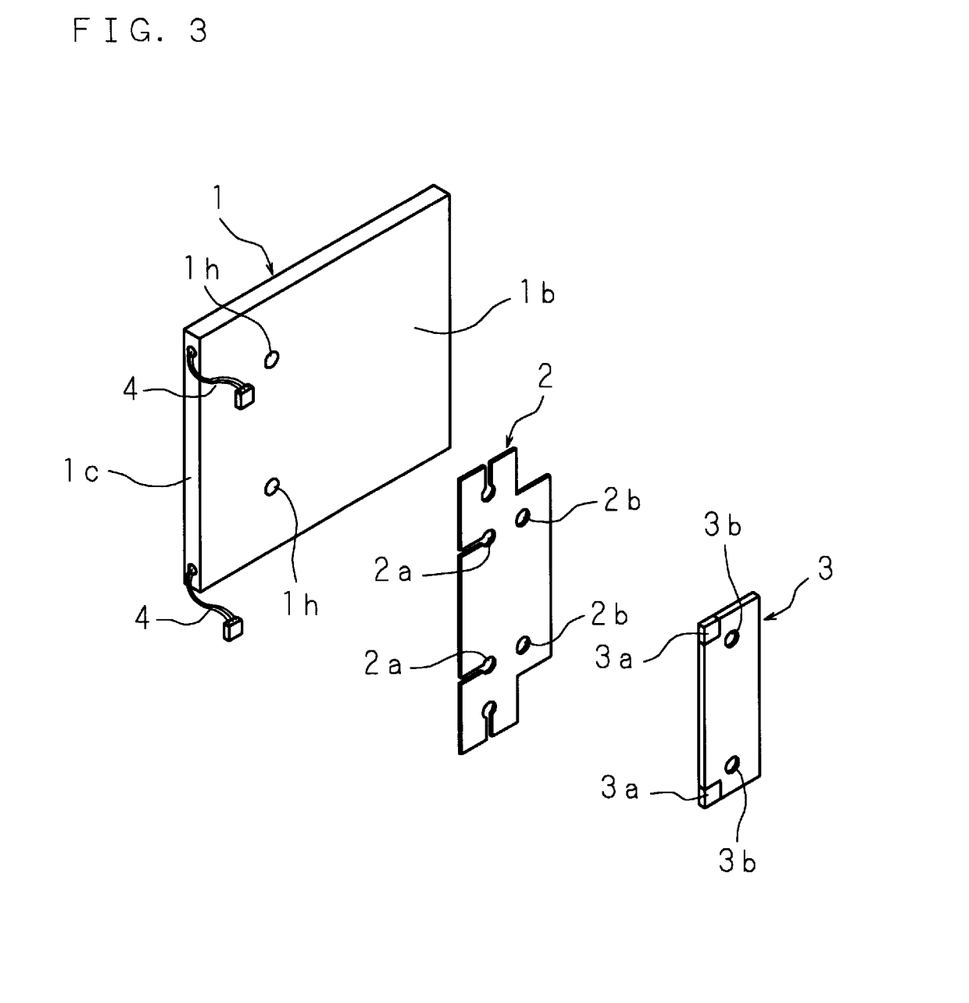
FIG. 3 is an exploded perspective view of a liquid crystal display unit of the present invention.
Figure 4:
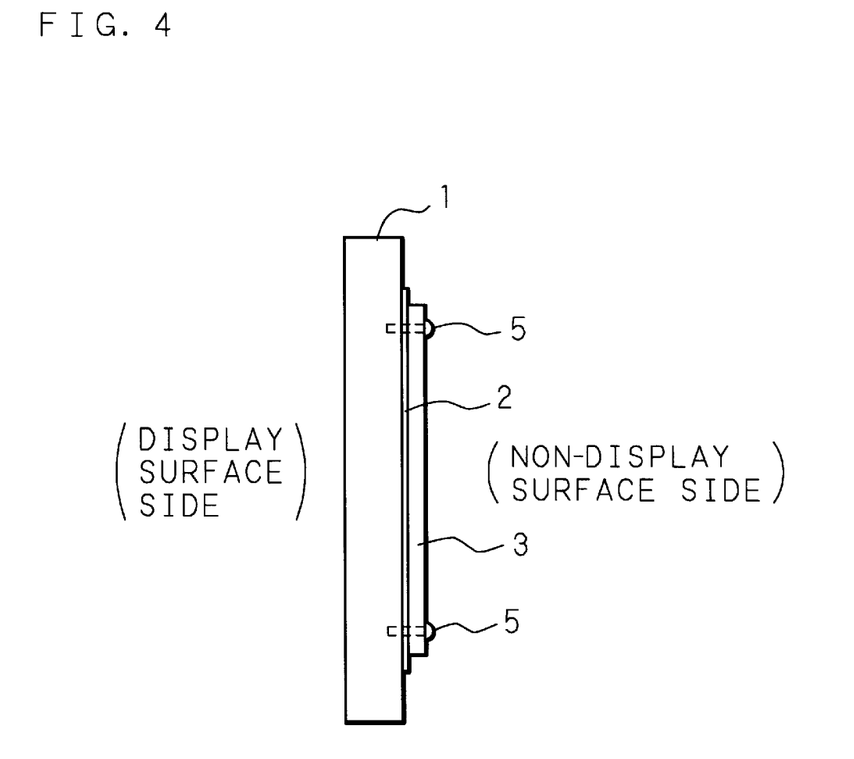
FIG. 4 is a side view of the liquid crystal display unit of the present invention.

FIG. 3 and FIG. 4 are the exploded perspective view and side view of a liquid crystal display unit of the present invention adopting measures to prevent a leakage electric field. The liquid crystal display unit of the present invention is configured by superimposing a liquid crystal display panel 1, a leakage electric field preventing sheet 2, and an inverter printed board 3 in this order.

Figure 5A:
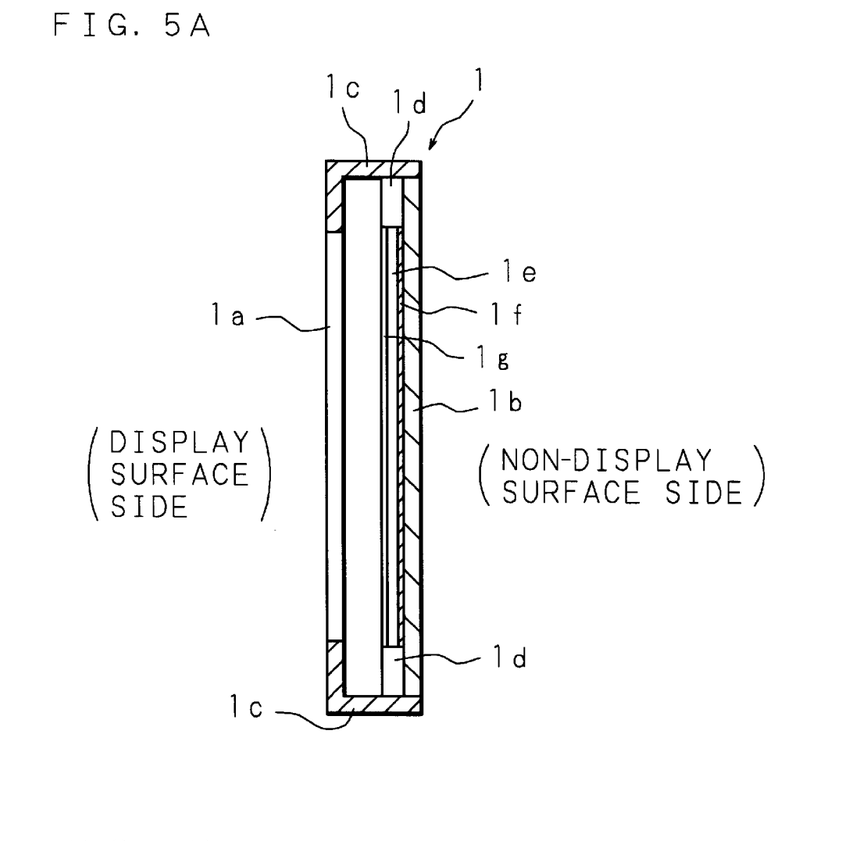
FIG. 5A is an internal structural view of a liquid crystal display panel.
Figure 5B:
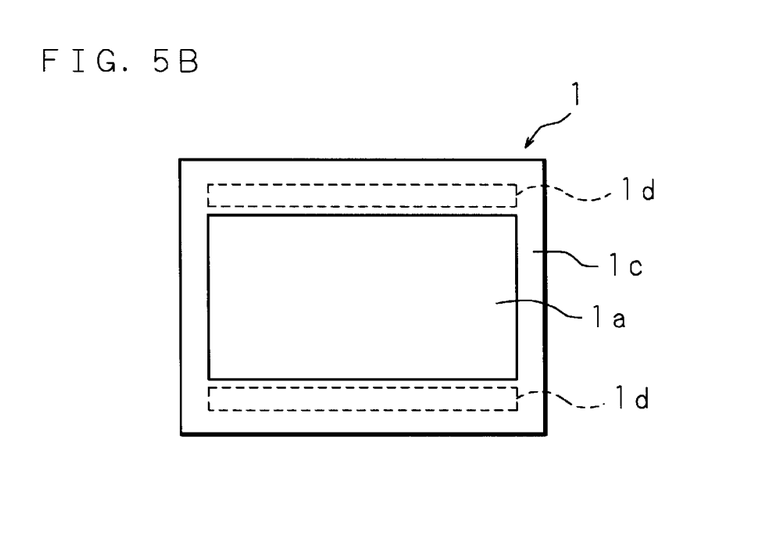
FIG. 5B is a front view of the liquid crystal display panel.

FIGS. 5A and 5B are the internal structural view and front view of the liquid crystal display panel 1. In FIGS. 5A and 5B, only the optical members related to the light emission of the liquid crystal display panel 1 are shown, and illustration of members related to the image display, such as a liquid crystal substance, common electrode, pixel electrode, and polarization plate, is omitted. The liquid crystal display panel 1 has a flat body including a glass plate 1a on its display surface side (front-face side), a conductive plate 1b on the non-display surface side (rear-face side), and a plastic plate 1c on each side-face side.

Fluorescent tubes 1d are attached to the upper and lower edges inside the liquid crystal display panel 1, respectively, a light-guide plate 1e is provided between these two fluorescent tubes 1d, and a reflective sheet 1f and a diffusion sheet 1g are placed to sandwich the light-guide plate 1e. With this configuration, light emitted by the light emission of the fluorescent tubes 1d travels in the light-guide plate 1e, and is reflected by the reflective plate 1f to the display surface side (glass plate 1a side) of the liquid crystal display panel 1. The intensity of the light is increased by the diffusion sheet 1g, and the light is radiated to the display surface side (front-face side) of the liquid crystal display panel 1 through the glass plate 1a.

Two bundles of fluorescent tube cables 4 composed of a plurality of thin wires for supplying a high voltage to the respective fluorescent tubes 1d are connected to the fluorescent tubes 1d, and each fluorescent tube cable 4 is extended to the non-display surface side (the conductive plate 1b side) through the side face (the plastic plate 1c) of the liquid crystal display panel 1. Moreover, screw holes 1h for attachment are formed in two positions of the liquid crystal display panel 1. Furthermore, portions of the non-display surface (the conductive plate 1b) of the liquid crystal display panel 1, which face notch portions 2a of the leakage electric field preventing sheet 2, are slightly raised. When the leakage electric field preventing sheet 2 is attached to the liquid crystal display panel 1, a clearance is created between them in these portions, and the intermediate portions of the fluorescent tube cables 4 are present in the clearance and come into contact with the non-display surface (the conductive plate 1b) of the liquid crystal display panel 1.

The leakage electric field preventing sheet 2 is made of insulating plastic, and has notch portions 2a in two positions in the upper and lower edges, respectively, for holding bundles of a plurality of thin wires of the fluorescent tube cables 4 extended to the non-display surface side (the conductive plate 1b side) of the liquid crystal display panel 1. By holding the fluorescent tube cables 4 with these notch portions 2a, the intermediate portions of the fluorescent tube cables 4 come into contact with the non-display surface (the conductive plate 1b) of the liquid crystal display panel 1. Moreover, the leakage electric field preventing sheet 2 has screw holes 2b in two positions corresponding to the screw holes 1h. Note that this leakage electric field preventing sheet 2 can have any shape if it has the function of causing the fluorescent tube cables 4 to come into contact with the non-display surface (the conductive plate 1b) of the liquid crystal display panel 1.

Printed on the inverter printed board 3 is an inverter circuit for converting an inputted DC low voltage (16 V, for example) into an AC high voltage (1500 V, for example). The inverter printed board 3 has two connecting parts 3a serving as high voltage outputting parts to which the fluorescent tube cables 4 are connected respectively. Further, the inverter printed board 3 has screw holes 3b which are formed in two positions corresponding to the screw holes 1h and the screw holes 2b.

The liquid crystal display unit of the present invention is assembled as follows. The intermediate portions of the fluorescent tube cables 4 are held with the notch portions 2a of the leakage electric field preventing sheet 2 so as to bring the intermediate portions into contact with the conductive non-display surface (the conductive plate 1b) of the liquid crystal display panel 1. The tips (connectors) of the fluorescent tube cables 4 are connected to the connecting parts 3a of the inverter printed board 3. Then, screws 5 are inserted into the screw holes 3b, screw holes 2b and screw holes 1h, and the screws 5 are screwed into the liquid crystal display panel 1 so as to attach and secure the leakage electric field preventing sheet 2 and inverter printed board 3 to the liquid crystal display panel 1.

In such a liquid crystal display unit of the present invention, since the intermediate portions of the fluorescent tube cables 4 are held with the notch portions 2a of the leakage electric field preventing sheet 2 so as to bring the intermediate portions into contact with the conductive non-display surface (the conductive plate 1b) of the liquid crystal display panel 1, the fluorescent tube cables 4 are grounded at the contact, thereby preventing a leakage electric field of low frequency which is produced from the fluorescent tube cables 4.

In the liquid crystal display unit of the present invention, since an extremely thin leakage electric field preventing sheet 2 is used to prevent a leakage electric field, there is no need to provide shield members as in the conventional example, and the thickness can be reduced significantly compared to the conventional example. Moreover, since an inexpensive leakage electric field preventing sheet 2 is used without using expensive shield members as in the conventional example, it is possible to reduce the cost as compared to the conventional example.

A liquid crystal display device of the present invention is constructed by including a liquid crystal display unit of the present invention having the above-described structure and by further attaching an input cable for inputting image data to be displayed, a driver circuit for driving a liquid crystal according to the image data, etc. In this liquid crystal display device, the liquid crystal display unit is housed inside a plastic cover together with the other members mentioned above. Here, since the liquid crystal display device of the present invention uses the liquid crystal display unit which is thinner and less expensive compared to the conventional example as described above, it can realize a decrease in the thickness and a reduction in the cost.

Next, the following description will explain the results of an experiment on the leakage electric field preventing effect of the liquid crystal display device of the present invention using the leakage electric field preventing sheet. Leakage electric fields of low frequency were measured about a liquid crystal display device as a comparative example in which the fluorescent tube cables extended from the non-display surface side (rear-face side) of the liquid crystal display panel are simply connected to the inverter printed board without using the above-mentioned leakage electric field preventing sheet and about a liquid crystal display device as an example of the present invention using the above-mentioned leakage electric field preventing sheet.

It was found from the results of measuring an electric field VLF that the electric field VLF of the comparative example was 10.75 V/m which was more than a standard value (10 V/m) of JEITA, but the electric field VLF of the example of the present invention was 5.94 V/m which was within the standard value (10 V/m) of JEITA. It can be understood from the results that the leakage electric field of low frequency produced from the fluorescent tube cable can also be prevented efficiently with the use of the extremely thin, inexpensive leakage electric field preventing sheet.

As described above, with the leakage electric field preventing sheet of the present invention, since the fluorescent tube cable extended from the conductive non-display surface side (rear-face side) of the liquid crystal display panel is brought into contact with the conductive non-display surface of the liquid crystal display panel, the fluorescent tube cable is grounded on the conductive non-display surface of the liquid crystal display panel. It is therefore possible to prevent the leakage electric field from the fluorescent tube cable in a simple manner without using shield members as in the conventional example. In this case, if the fluorescent tube cable is held with the notch portion formed in the leakage electric field preventing sheet, then it can be certainly brought into contact with the conductive non-display surface of the liquid crystal display panel.

In the liquid crystal display unit of the present invention, since the leakage electric field from the fluorescent tube cable is prevented using an extremely thin, inexpensive leakage electric field preventing sheet, shield members which are used in the conventional example are unnecessary, thereby enabling reductions in the thickness and cost of the liquid crystal display unit.

Since the liquid crystal display device of the present invention includes a liquid crystal display unit that prevents the leakage electric field from the fluorescent tube cable in a simple manner, shield members which are used in the conventional example are unnecessary, thereby enabling reductions in the thickness and cost of the liquid crystal display device.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A non-conductive leakage electric field preventing sheet for preventing a leakage electric field which is produced from a fluorescent tube cable for supplying electric power to one or a plurality of fluorescent tubes attached to a liquid crystal display panel having a conductive non-display surface at the opposite side of a display surface, the leakage electric field preventing sheet being configured so as to bring the fluorescent tube cable into contact with the non-display surface of the liquid crystal display panel.

2. The leakage electric field preventing sheet of claim 1, comprising a notch portion for holding the fluorescent tube cable.

3. A liquid crystal display unit comprising:
a liquid crystal display panel including one or a plurality of fluorescent tubes;
a fluorescent tube cable for supplying electric power to the fluorescent tube;
a leakage electric field preventing sheet of claim 2; and an inverter printed board connected to the fluorescent tube cable.

4. A liquid crystal display device for displaying an image by driving a liquid crystal, comprising a liquid crystal display unit of claim 3.

5. A liquid crystal display unit comprising:

a liquid crystal display panel including one or a plurality of fluorescent tubes;

a fluorescent tube cable for supplying electric power to the fluorescent tube;

a leakage electric field preventing sheet of claim 1; and an inverter printed board connected to the fluorescent tube cable.

6. A liquid crystal display device for displaying an image by driving a liquid crystal, comprising a liquid crystal display unit of claim 3.

7. A liquid crystal display unit comprising:

a liquid crystal display panel including a conductive non-display surface, and one or a plurality of fluorescent tubes;

a fluorescent tube cable for supplying electric power to the fluorescent tube; and a non-conductive sheet for bringing the fluorescent tube cable into contact with the non-display surface of the liquid crystal display panel.

8. A liquid crystal display unit of claim 7, wherein the sheet has a notch portion for holding the fluorescent tube cable.

9. A liquid crystal display unit of claim 7, further comprising an inverter printed board connected to the fluorescent tube cable.

10. A method for preventing a leakage electric field which is produced from a fluorescent tube cable for supplying electric power to one or a plurality of fluorescent tubes attached to a liquid crystal display panel having a conductive non-display surface at the opposite side of a display surface, comprising the steps of:

preparing a non-conductive sheet; and bringing the fluorescent tube cable into contact with the non-display surface of the liquid crystal display panel by the sheet.

11. The leakage electric field preventing method of claim 10, wherein the sheet has a notch portion, and the fluorescent tube cable is held with the notch portion and brought into contact with the non-display surface of the liquid crystal display panel.

* * * * *

UNITED STATES PATENT AND TRADEMARK OFFICE
CERTIFICATE OF CORRECTION

PATENT NO. : 6,683,664 B2
DATED : January 27, 2004
INVENTOR(S) : Masaki Noborio It is certified that error appears in the above-identified patent and that said Letters Patent is hereby corrected as shown below:

<u>Column 7,</u>
Line 5, delete "3" and insert -- 5 -- therefor.

Signed and Sealed this

Twentieth Day of July, 2004

JON W. DUDAS
*Acting Director of the United States Patent and Trademark Office*